United States Patent
Tu (12) 
(10) Patent No.: US 6,219,470 B1
(45) Date of Patent: Apr. 17, 2001

(54) WAVELENGTH DIVISION MULTIPLEXING TRANSMITTER AND RECEIVER MODULE

(76) Inventor: Xiang Zheng Tu, 440 Davis Ct., #314, San Francisco, CA (US) 94111

( * ) Notice: Subject to any disclaimer, the term of this patent is extended or adjusted under 35 U.S.C. 154(b) by 0 days.

(21) Appl. No.: 09/401,744

(22) Filed: Sep. 23, 1999

(51) Int. Cl.[7] .................................................. G02B 6/30

(52) U.S. Cl. .................. 385/14; 385/76; 385/83; 359/112; 359/114

(58) Field of Search .................. 385/14, 76, 83; 359/124, 114, 115, 116, 117

(56) References Cited

U.S. PATENT DOCUMENTS

| | | | |
|---|---|---|---|
| 5,757,999 | * 5/1998 | Tabuchi et al. | 385/93 |
| 5,859,943 | * 1/1999 | Asakura et al. | 385/49 |
| 6,085,000 | * 7/2000 | Tanaka et al. | 385/45 |

* cited by examiner

Primary Examiner—Mohammad Sikder
(74) Attorney, Agent, or Firm—Bruce H. Johnsonbaugh (57) ABSTRACT

A wavelength division multiplexing transmitter and receiver module utilizes a micromachined silicon substrate as the mounting platform for its optical components and optoelectronic devices including an optical fiber, a transmitter, two receivers, and three microlenses. The micromachined silicon substrate has a V-groove for placing an optical fiber so that it is aligned with the mounted transmitter and the mounted receivers passively and has more V-grooves with slanted end side walls and opposite vertical end side walls used to form a dielectric multilayered filter, a half-mirror, and two anti-reflectors thereon which are eventually incorporated to be a multiplexer and/or a demultiplexer. The microlenses are disposed on V-supports. The transmitter is pre-mounted mounted on a V-submount. The microlens and the transmitter are then mounted into the V-grooves of the micromachined silicon substrate and aligned with the mounted optical fiber passively.

22 Claims, 10 Drawing Sheets

WAVELENGTH DIVISION MULTIPLEXING TRANSMITTER AND RECEIVER MODULE

BACKGROUND OF THE INVENTION

This invention generally relates to a wavelength division multiplexing transmitter and receiver module, and particularly relates to a wavelength division multiplexing transmitter and receiver module utilizing an etched silicon substrate as the mounting platform for the optical components and optoelectronic devices and a microstructure formed in the silicon substrate as the building base for the multiplexer and/or the demultiplexer.

In order to provide high bandwidth communications to the subscriber, some sophisticated system configurations based on full fiber-optic access network such as fiber-to-the-home (FTTH) or fiber-to-the-desktop (FTTD) are required. The technology for such systems exists, but it can not proliferate unless costs are reduced substantially, especially the costs of the opto-electronic network unit (ONU) working as a wavelength division multiplexing transmitter and receiver module. To make FTTH or FTTD economically feasible, several wavelength division multiplexing transmitter and receiver modules suitable for high-volume, low-cost manufacturing have been developed.

Figure 1:
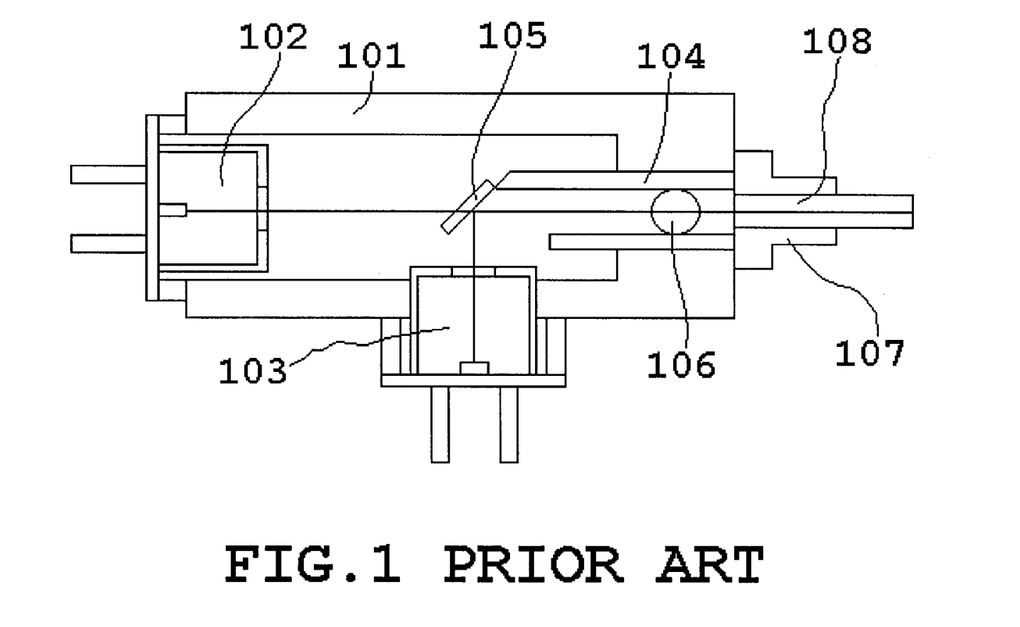
FIG. 1 illustrates a cross sectional view of a wavelength division multiplexing transmitter and receiver module in accordance with a prior art.

One such module, as shown in FIG. 1, comprises a sealed TO can transmitter 102 and a hermetically sealed TO can receiver 103 that are mounted in an orthogonal fashion in a common hollow housing 101 to effect the module. An optical fiber 108 is inserted in the housing through a connector 107. The optical fiber transmits light to and from the module via a spherical lens 106. An optical beamsplitter 105 supported by a spacer tube 104 can be wavelength dependent or a proportional splitter that deflects light in a defined intensity to the receiver or the detector. The wavelength selectivity requirement of the detector and the transmitter or the emitter is then effected by selective wavelength filtering prior to the light's impinging on the detector. The various subassemblies are then adjusted for optical alignment and finally fixed in final position.

The drawback to this configuration is that the autonomous emitter and detector are aligned in the common housing either iteratively or successively with the various optical elements of the system to optimize the input and output performance. This approach is clearly a complicated and labor intensive approach, which accordingly increases the cost of the devices. Furthermore, in the preferred embodiment, the lens element for the light emitter is within the encapsulation, and the optical alignment of this due to the close proximity of the lens to the emitter is rather difficult, and thus a labor intensive effort that serves to further increase the cost of manufacture.

Figure 2:
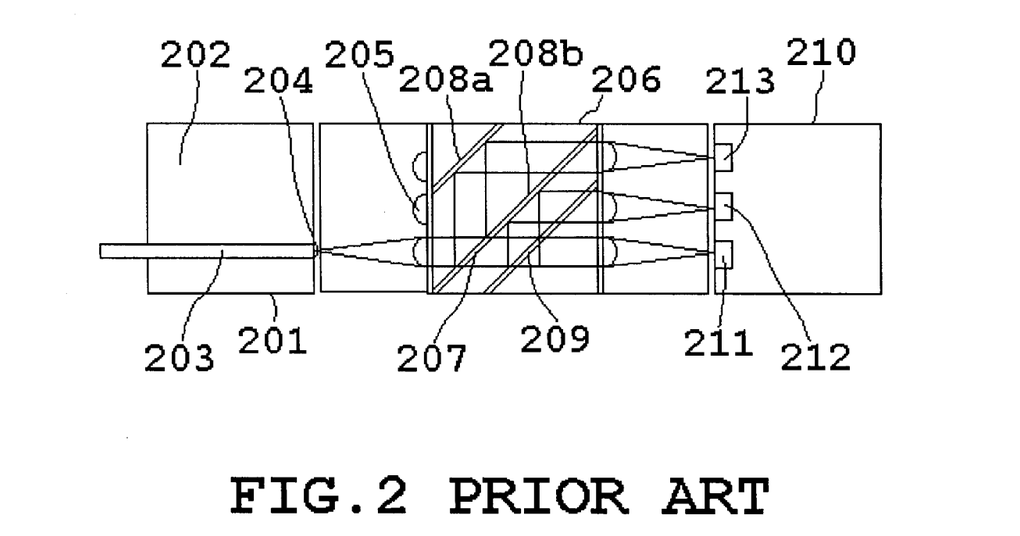
FIG. 2 illustrates a cross sectional view of a wavelength division multiplexing transmitter and receiver module in accordance with another prior art.

Another wavelength division multiplexing transmitter and receiver module, as shown in FIG. 2, consists of three major parts: an optical block 201, an optical network unit chip 206, and an electronic block 210. On the optical block 201 side, an optical fiber 203 held in a V-groove of a silicon wafer 202 and coming from the subscriber line terminal is coupled to the planar microlens 205 where wavelengths of 1.3 $\mu$m (digital voice signal) and 1.55 $\mu$m (analog video signal) are converted into collimated optical beams. The optical network unit chip 206, fabricated by stacked planar optical technique, is composed of stacked glass slices coated by dielectric multilayered filters such as wavelength division multiplexing splitting filters 207, half-mirrors 209 and mirrors 208a, 208b. This unit is then sandwiched by planar microlens array blocks. At the optical network unit chip 206, wavelengths of 1.3 $\mu$m and 1.55 $\mu$m are split by the dielectric multilayered wavelength division multiplexing filter 207 in such way that 1.3 $\mu$m wavelength is transmitted straight while the 1.55 $\mu$m one is reflected. The wavelength of 1.3 $\mu$m is reflected by the half-mirror 209 and the mirror 208b, focused by one of the microlenses of the planar microlens array, located next to the electronic block 210, and then detected by a 1.3 $\mu$m photodetector 212. The wavelength of 1.55 $\mu$m is reflected by the mirror 208a, focused by another microlens of the planar microlens array and detected by a 1.55 $\mu$m photodetector 213. For 1.3 $\mu$m transmission, a light optical beam coming from the 1.3 $\mu$m laser diode 211, located at the electronic block 210, is coupled with a microlens of the planar microlens array converting it into a collimated optical beam. Then, it enters the optical network unit chip 206, passing straight through the half-mirror 209 and the wavelength division multiplexing filter 207, and focused onto the optical fiber 203 located at the optical block 201 at the planar microlens array. Coupling between the planar microlens array 205 and the optical fiber 203 is realized by a put-in micro-connector scheme 204. The dielectric multilayered wavelength division multiplexing filters 207, half-mirrors 209 and mirrors 208a, 208b are fabricated by electron optical beam evaporation method on the glass substrate.

In this configuration the optical network unit and the planar microlens arrays block are not integrated in a single substrate. Active alignment and fixation for connecting the optical network unit and the planar microlens arrays block are still required. The space between the two adjacent optical beams coming out of the optical network unit is small since the optical network unit is formed by the thin-film deposition technology. This would make the interface of the optical network unit with the optoelectronic devices very complicated because the optoelectronic devices have not been shrunk accordingly to match the size of the optical network unit.

SUMMARY OF THE INVENTION

A purpose of the present invention is to provide a wavelength division multiplexing transmitter and receiver module utilizing a micromachined silicon substrate as the mounting platform for its needed components and devices and a microstructure integrally created in the silicon substrate as the building base for the multiplexer and/or the demultiplexer.

Another purpose of the present invention is to provide a wavelength division multiplexing transmitter and receiver module allowing its optical components including microlenses, filters, half-mirror, and anti-reflectors to be fabricated in a manner similar to semiconductor devices.

Still another purpose of the present invention is to provide a wavelength division multiplexing transmitter and receiver module assembled by using technologies developed for multi-chip modules (MCM) packaging.

Still another purpose of the present invention is to provide a wavelength division multiplexing transmitter and receiver module allowing an optical fiber incorporated into the module in a passive alignment manner.

Still another purpose of the present invention is to provide a wavelength division multiplexing transmitter and receiver module having a transmitter pre-mounted on a V-submount so that it can be incorporated into the module in a passive alignment manner.

Still another purpose of the present invention is to provide a wavelength division multiplexing transmitter and receiver module having microlenses each disposed on a side surface of a V-support so that they are incorporated into the module in a passive alignment manner.

BRIEF DESCRIPTION OF THE DRAWINGS

The present invention may best be understood by referring to the following description and accompanying drawings which illustrate the present invention. In the drawings.

DETAILED DESCRIPTION OF THE INVENTION

Figure 3:
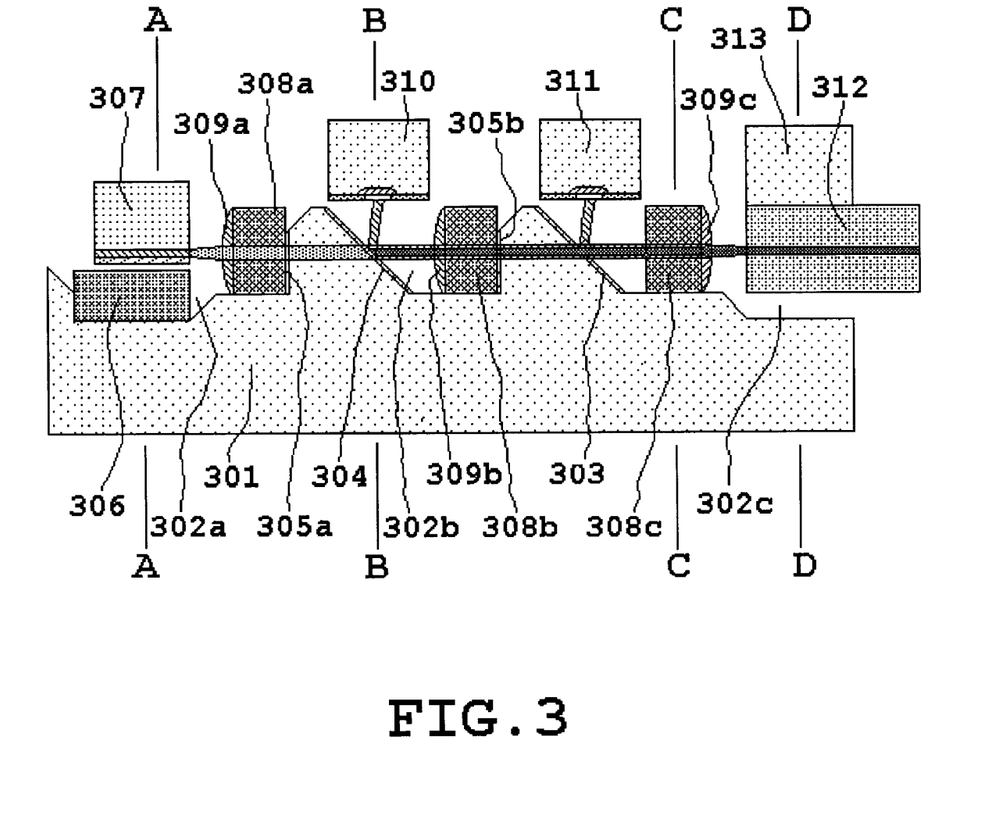
FIG. 3 illustrates a cross sectional view of a wavelength division multiplexing transmitter and receiver module in accordance with the present invention.

The above mentioned purposes and other purposes are realized through a wavelength division multiplexing transmitter and receiver module provided in accordance with the present invention. As shown in FIG. 3, the wavelength division multiplexing transmitter and receiver module comprises a silicon substrate 301 micromachined to have three V-grooves 302a, 302b, and 302c with a common longitudinal axis. A slanted end side wall of the V-groove 302c which intersects with the common longitudinal axis is coated with thin dielectric films to form a dielectric multilayered filter 303. A slanted end side wall of the V-groove 302b which is parallel to the slanted end side wall of the V-groove 302c is coated with thin dielectric films to form a dielectric multilayered half-mirror 304. The other slanted end side wall of the groove 302b and the slanted end side wall of the groove 302a which intersect with the common longitudinal axis are cut to form vertical end side walls perpendicular to the common longitudinal axis. Dielectric multilayered anti-reflectors 305a and 305b are formed on the surfaces of the two vertical side walls respectively. The module further comprises an optical fiber 312, a transmitter 307, three microlenses 309a, 309b, 309c and their V-supports 308a, 308b, 308c, and two receivers 310, 311. The optical fiber 312 is placed in the V-groove 302c so that its core is aligned with the common longitudinal axis. The transmitter 307 has a silicon V-submount 306 and is placed in the V-groove 302a by pressing the silicon V-submount into the V-groove so that a light optical beam coming from the transmitter 307 can pass through the two silicon dams between each two of the V-grooves, the multilayered half-mirror 304 and multilayered filter 303, and then enter the core of the optical fiber 312. The microlenses 309a, 309b, 309c are placed in the V-groove 302a, 302b, and 302c by pressing the glass V-submounts 308a, 308b, and 308c into their corresponding V-grooves. The receiver 311 is mounted on the top of the silicon substrate 301 so that a light optical beam with a first wavelength coming from the optical fiber 312 is reflected by the multilayered filter 303 and impinged onto its optical sensitive area. The other receiver 310 is mounted on the top of the silicon substrate 301 so that another light optical beam with a second wavelength coming from the optical fiber 312 is reflected by the multilayered half-mirror 304 and impinged onto its optical sensitive area. The wavelength division multiplexing transmitter and receiver module is designed to operate at wavelengths of 1.3 $\mu$m and 1.55 $\mu$m. It is noted that the absorption edge of the optical absorption spectrum of silicon is at 1.15 ev or 0.927 $\mu$m and silicon is transparent for the optical beams with the wavelengths of both 1.3 $\mu$m and 1.55 $\mu$m.

Figure 4:
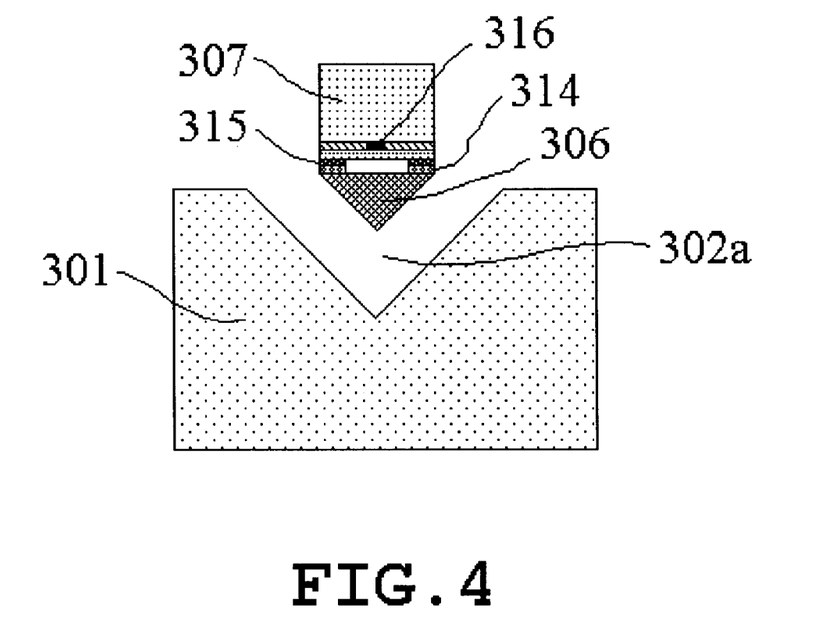
FIG. 4 illustrates the cross sectional view along the A—A line of the wavelength division multiplexing transmitter and receiver module shown in FIG. 3.

Referring to FIG. 4, it shows the cross sectional view along the A—A line of the FIG. 3. It can be seen that a transmitter is placed in a V-groove of a silicon substrate. The transmitter, such a laser diode 307 has a light emitting stripe 316 and bond pads 315. The laser diode 307 is pre-mounted on a V-submount 306. The V-submount 306 is preferably formed by etching a (100) silicon wafer in an anisotropic etching solution so that it automatically mates a V-groove 302a of a silicon substrate 301 etched by anisotropic etching. The laser diode 307 is mounted on the V-submount 306 with its bond pads 315 facing down and it is kept in place by the restoring force of two melted solder bumps 314 of the V-submount 306. The thickness of the V-submount 306 is defined so that the light coming out from the emitting stripe 316 of the laser diode 307 is aligned with the longitudinal axis of the V-groove 302a.

Figure 5:
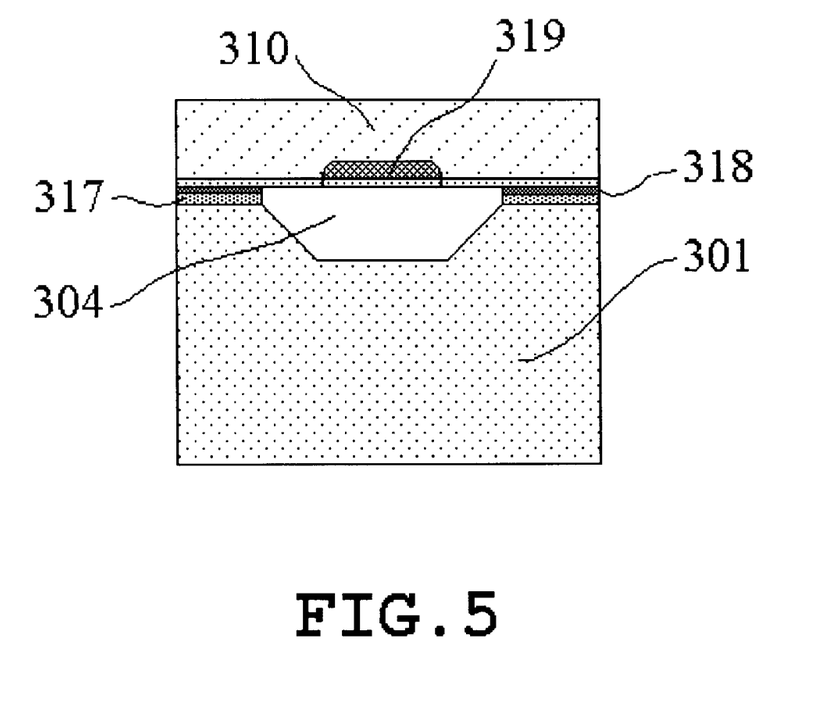
FIG. 5 illustrates the cross sectional view along the B—B line of the wavelength division multiplexing transmitter and receiver module shown in FIG. 3.

FIG. 5 shows the cross sectional view along the B—B line of the FIG. 3. It can be seen that a photodetector is placed on the top of a V-groove of a silicon substrate. The photodetector 310 has an optical sensitive area 319 and bond pads 318. A silicon substrate 301 is etched to form a V-groove. Then a multilayered half-mirror 304 is formed on a slanted end side wall of the groove. The silicon substrate 301 is also processed to form solder bumps 317 at the two sides of the top of the multilayered half-mirror 304. The photodetector 310 is kept in place by joining its bond pads 318 and the solder bumps 317 of the silicon substrate 301 together so that a light optical beam coming from an optical fiber help in the V-groove and reflected by the multilayered half-mirror 304 directly illustrates the optical sensitive area 319 of the photodetector 310.

Figure 6:
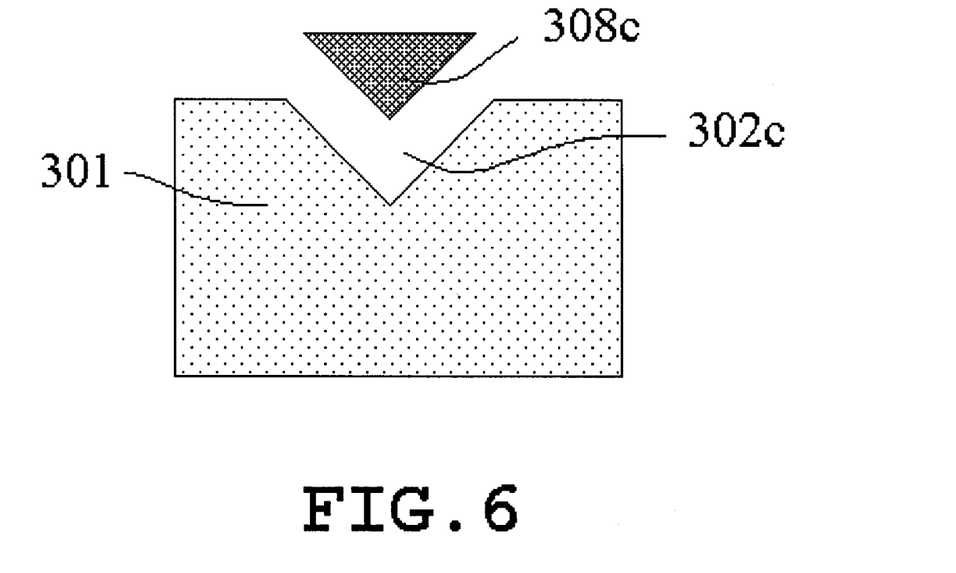
FIG. 6 illustrates the cross sectional view along the C—C line of the wavelength division multiplexing transmitter and receiver module shown in FIG. 3.

FIG. 6 shows the cross sectional view along the C—C line of the FIG. 3. It can be seen that a microlens is placed in a V-groove of a silicon substrate. The microlens is disposed on a V-support 308c. The V-support 308c is designed to mate a V-groove 302c etched into a silicon substrate 301. When the microlens is kelp in place its optical axis is automatically aligned with the longitudinal axis of the V-groove 302c.

Figure 7:
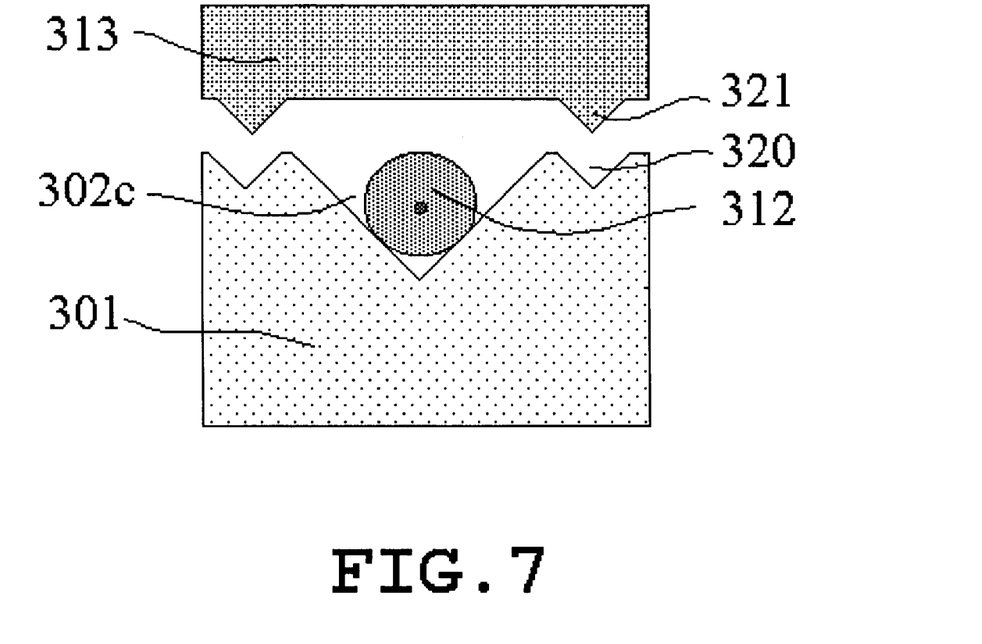
FIG. 7 illustrates the cross sectional view along the D—D line of the wavelength division multiplexing transmitter and receiver module shown in FIG. 3.

FIG. 7 shows the cross sectional view along the D—D line of the FIG. 3. It can be seen that an optical fiber is placed in a V-groove of a silicon substrate. A cover 313 with alignment ribs 321 is formed by etching a silicon substrate in an anisotropic etching solution. Another silicon substrate 301 is etched to form a V-groove 302c and alignment notches 320. The optical fiber 312 is placed in the V-groove 302c and then the cover 313 is mounted on the top the optical fiber 312 so that the ribs 321 of the cover 313 are inserted into the notches 320 of the silicon substrate 301. It is desired to keep the core of the optical fiber 312 aligned with the longitudinal axis of the V-groove 302c.

The wavelength division multiplexing transmitter and receiver module shown in FIG. 3 utilizes a micromachined silicon substrate as the mounting platform for the transmitter, receivers, microlenses and optical fiber therein and a micromachined structure as the attachment base for the multilayered filter, multilayered half-mirror, and multilayered anti-reflector. A fabrication sequence for the mounting platform, the microstructure, the multilayered filter, multilayered half-mirror, and multilayered anti-reflector attached to the microstructure is shown in FIG. 8A to FIG. 8C.

Figure 8A:
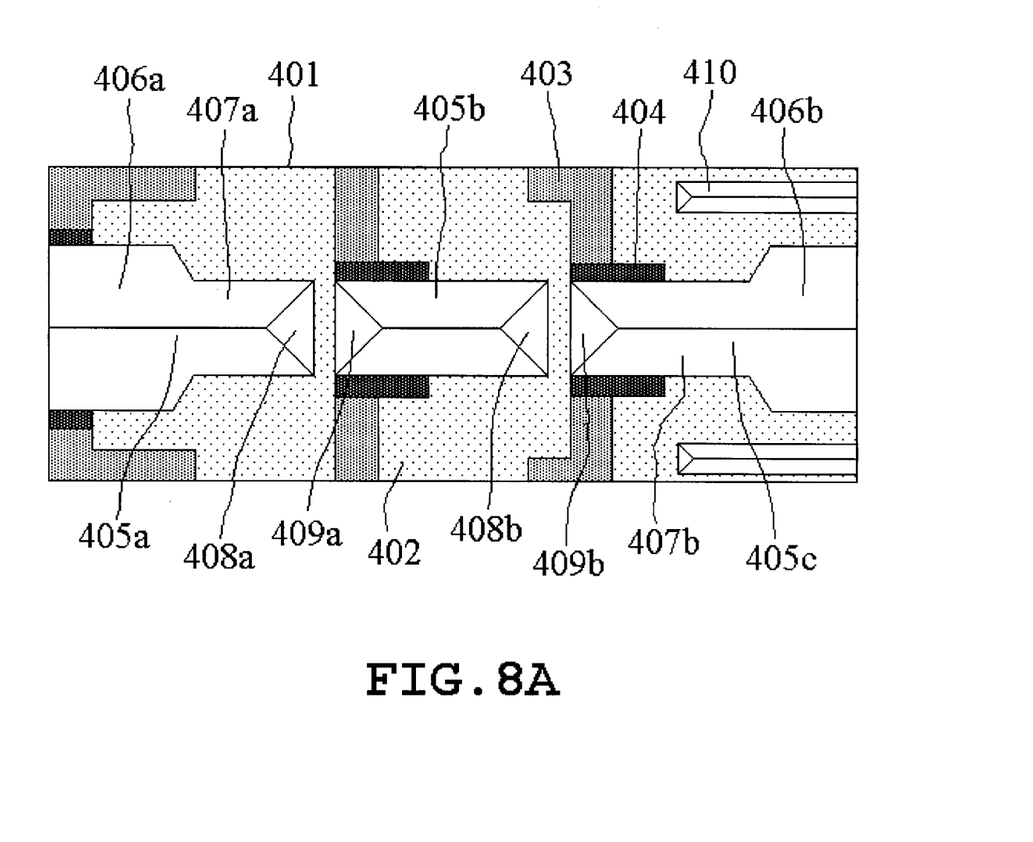
FIG. 8A–FIG. 8C illustrate plan views of a silicon micromachined platform used for the wavelength division multiplexing transmitter and receiver module shown in FIG. 3 at its fabrication steps.
Figure 8B:
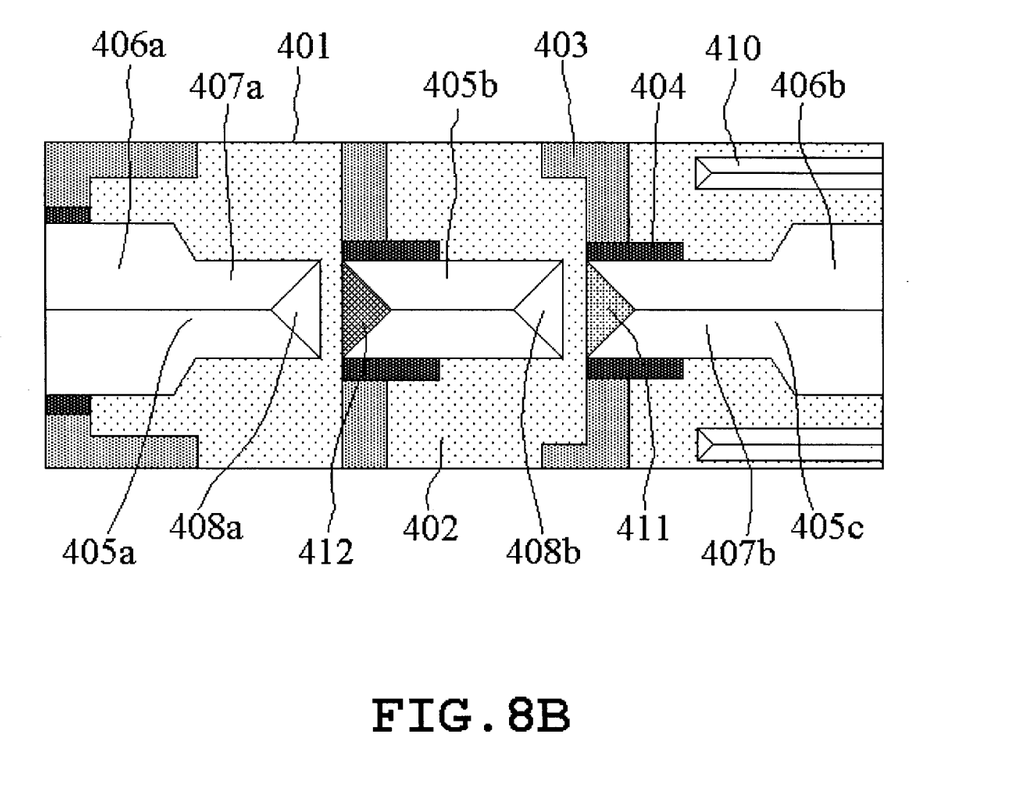
Figure 8C:
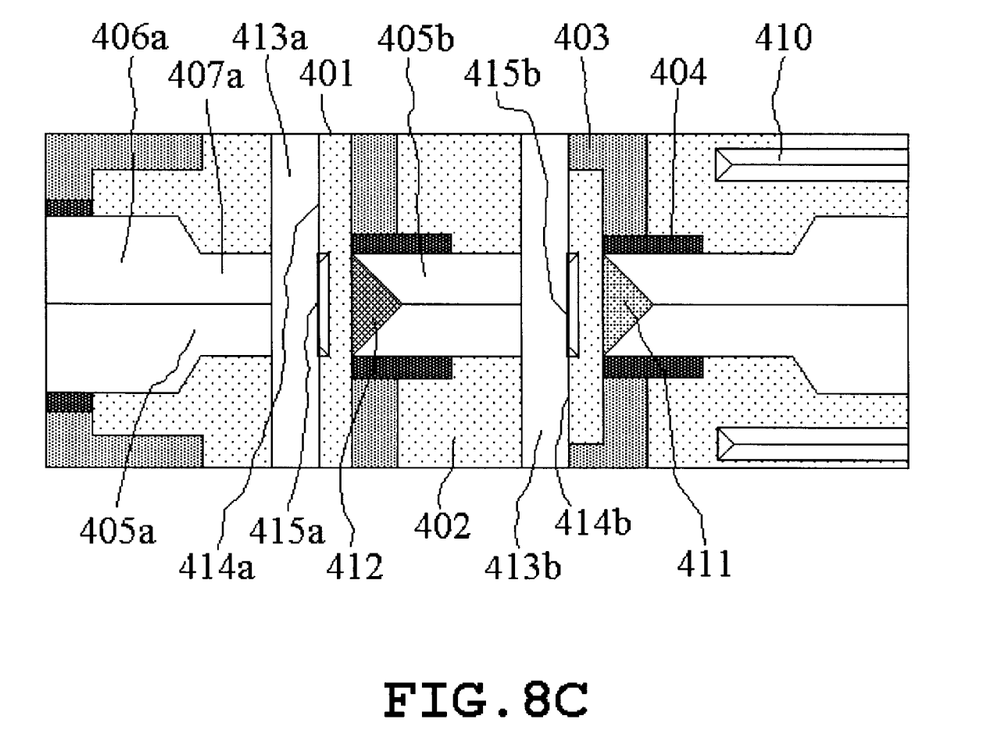

Referring to FIG. 8A, a (100) silicon substrate 401 is micromachined to form three V-grooves 405a, 405b, and 405c with a common longitudinal axis. The V-groove 405a has a wider section 406a, a narrower section 407a, and a slanted end side wall 408a. The V-groove 405b has two opposite slanted end side walls 408b and 409a. The V-groove 405c has a narrower section 407b, a wider section 406b, and a slanted end side wall 409b. The silicon substrate 401 is also micromachined to form a pair of alignment notches 410 parallel to the common longitudinal axis of the grooves 405a, 405b, and 405c. The surface of the silicon substrate 401 is coated with a dielectric layer 402. Three pairs of bonding pads 403 and three pairs of solder bumps 404 are formed on the surface of the dielectric layer 402.

The micromachining of (100) silicon 401 is based on anisotropic chemical etching in potassium hydroxide (KOH) solution. Since the etch rate of {111} planes is much lower than the etch rate of {100} planes, any etched cavities in the (100) silicon will be bounded by {111} planes. Before anisotropic etching, a composite layer 402 is formed by a two step process. The first step is to form a 1000 Å thick $SiO_2$ layer on the surface of the silicon substrate 401 by oxidization at 1100° C. in wet $O_2$ atmosphere. The second step is to form a 1500 Å thick $Si_3N_4$ layer by low pressure chemical vapor deposition (LPCVD). The composite layer 402 is used for both the anisotropic etch mask layer and the electrical isolation layer. It is followed by forming a chrome (Cr)/gold (Au) composite layer by electron beam evaporation which is used as the metallization material. Then a photolithography process is performed to form a metallization pattern 403. Another photolithography process is continued for creating openings in the photoresist layer at the edges of the V-grooves. Using the photoresist pattern as a mask, Indium (In) electroplating is carried out to form Indium bumps 404 on the surface of the Cr/Au composite layer.

The conditions for the anisotropic etching are 40 wt % KOH, glass container, electromagnetic stirring, at 70° C. By the use of a sufficiently large rectangular mask opening, the anisotropic etching continues to the depth of the wafer forming a slanted facet on each edge of the pattern. It was readily demonstrated that these facets can be applied for light optical beam deflection. The revealed {111} planes form an angle of 54.74° with the surface of the silicon substrate, so the light optical beams will illustrate the photodetector at a small angle which has advantage that back-reflections into the optical fiber are reduced. The resulting shift of the reflected optical beams is easily compensated during the design of the connection path for the detector in order to center the light spots on the photodetector.

Since dielectric materials silicon dioxide ($SiO_2$), silicon nitride ($Si_3N_4$), and metal materials Cr, Au, In can not be attacked by KOH solution, the metallization can be patterned and the solder bumps can be plated prior to the anisotropic etching step. This has the benefit of keeping the substrate planar during most of the processing sequence (enabling standard lithography) and the potential deterioration of the mirror surface quality is obviated. Although no protective layer is applied for the connection pattern, no damage or adhesion decay occur during the extensive exposure to the KOH-based anisotropic etching solution.

FIG. 8B shows the formation of a multilayered filter 411 on the surface of the slanted end side wall 409b and a half-mirror 412 on the surface of the slanted end side wall 409a. The multilayered filter 411 is made of multiple pairs of quarter-wavelength layers with high and low refractive index. Since amorphous Si has a refractive index of 3.5-i0.0025 and $SiO_2$ has a refractive index of 1.4 they are preferably chosen to form the multilayered filter 411 and the half-mirror 412. The amorphous Si and $SiO_2$ layer are formed in sequence by electron beam evaporation using a rigid mask, such as a molybdenum (Mo) plate mask. The number of the pairs of amorphous Si and $SiO_2$ layers is determined by a multilayered filter design. The half-mirror 412 is also made of multiple pairs of quarter-wavelength amorphous silicon and $SiO_2$ layers, but has a different number of layers.

As an alternative, the half-mirror 412 is made of a metal layer, such as a gold layer formed by electron beam evaporation.

FIG. 8C shows the formation of channels 413a and 413b with vertical side walls 414a and 414b and anti-reflectors 415a and 415b. The channels 413a and 413b are formed by laser ablation. The laser beam is oriented normal to the silicon substrate 401, and scanned across a slanted end side wall in such way that greater exposure times are used when the most amount of silicon material is to be removed. By suitable control of this laser ablation process any designed shape can be implemented.

As an alternative, the channels 413a and 413b are formed by dicing saw cutting. It is able to form channels with smooth surface using appropriate grit size and cutting speed.

The anti-reflectors 415a and 415b are also made of multiple pairs of quarter-wavelength Si and $SiO_2$ layers, but has a small number of layers.

Figure 9A:
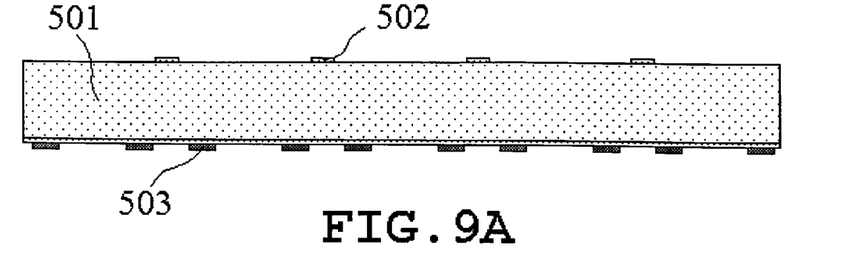
FIGS. 9A–9D illustrate cross sectional views of pre-mounted transmitters used for the wavelength division multiplexing transmitter and receiver module shown in FIG. 3 at their fabrication steps.
Figure 9B:
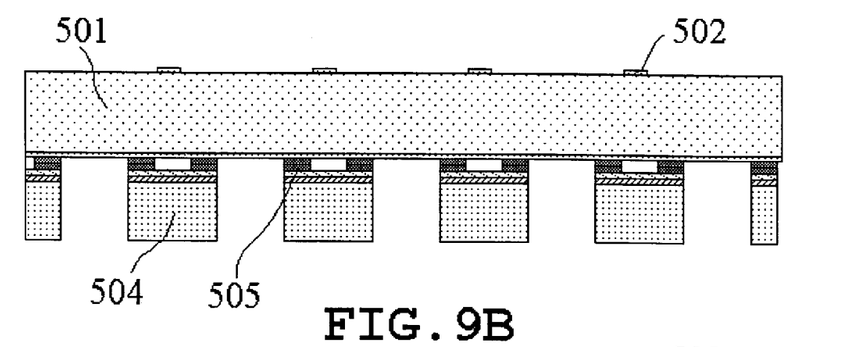
Figure 9C:
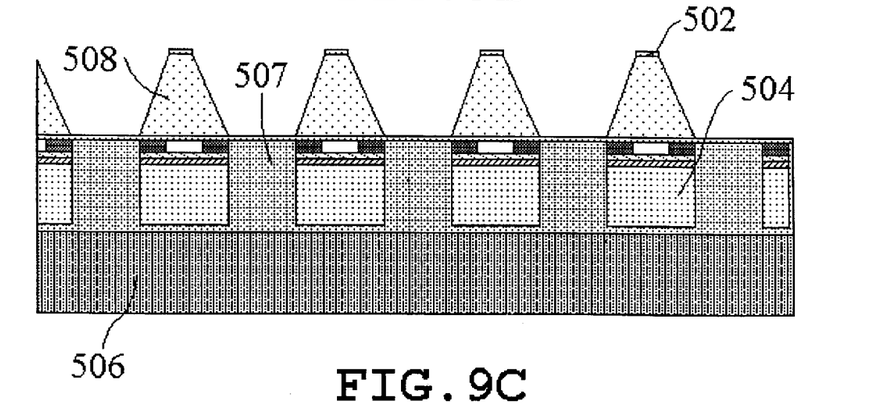
Figure 9D:
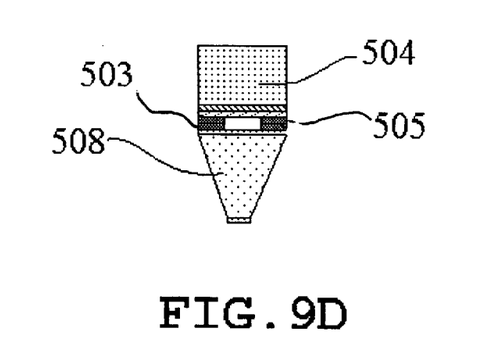

Anisotropic etching in KOH solution is also used to form V-supports for pre-mounting transmitters. A fabrication sequence for mounting transmitters on V-supports shown in FIG. 9A to FIG. 9D. A starting silicon material is a (100) oriented silicon wafer 501 with the two sides polished. The silicon wafer 501 is oxidized at 1100° C. in wet $O_2$ atmosphere to form a 1000 Å thick $SiO_2$ layer and then is coated with a 1500 Å thick $Si_3N_4$ layer deposited by LPCVD. The back side of the silicon wafer 501 is coated with a Cr/Au layer deposited by electron beam evaporation. A photolithography process is performed to form etching mask pattern 502 on the front side of the silicon wafer 501. A two side alignment photolithography process is performed to form a metallization pattern including bond pads 503 on the back side of the silicon wafer 501, as shown in FIG. 9A. Transmitters 504 are bonded to the back side of the silicon wafer 501 so that each bond pad 503 is located on a solder bump 505 of the transmitters 504, as shown in FIG. 9B. The silicon wafer 501 is bonded to a glass plate 506 using an adhesive layer 507 with the back side down. The silicon wafer 501 is etched in KOH solution until the formed V-grooves passing through the whole wafer, as shown in FIG. 9C. Immersing the silicon wafer 501 in a solution to remove the adhesive layer 507 and then separate the individual transmitters 504 mounted on V-supports 508 from the glass plate 506, as shown in FIG. 9D.

Figure 10A:
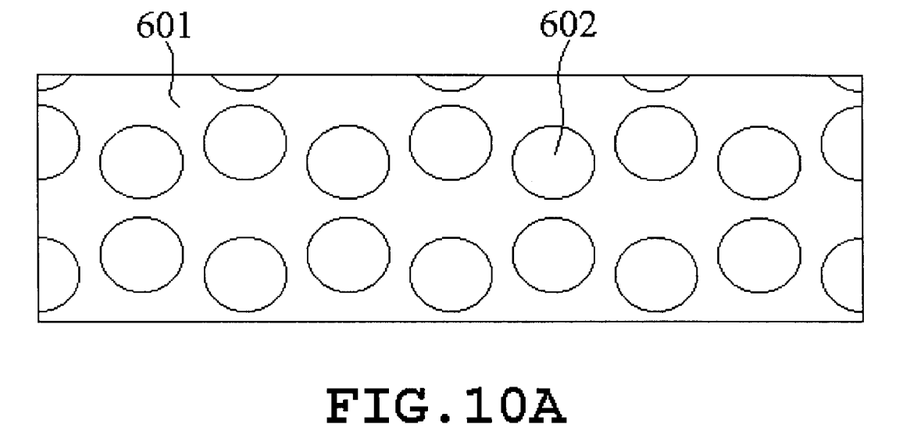
FIGS. 10A—10C illustrate cross sectional and plan views of microlens supported by V-submounts used for the wavelength division multiplexing transmitter and receiver module shown in FIG. 3 at their fabrication steps.
Figure 10B:
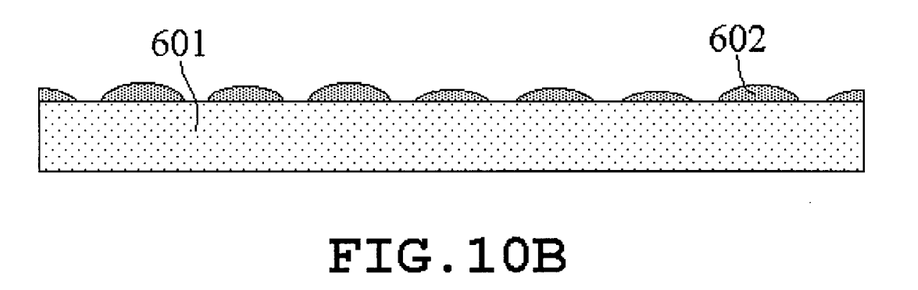
Figure 10C:
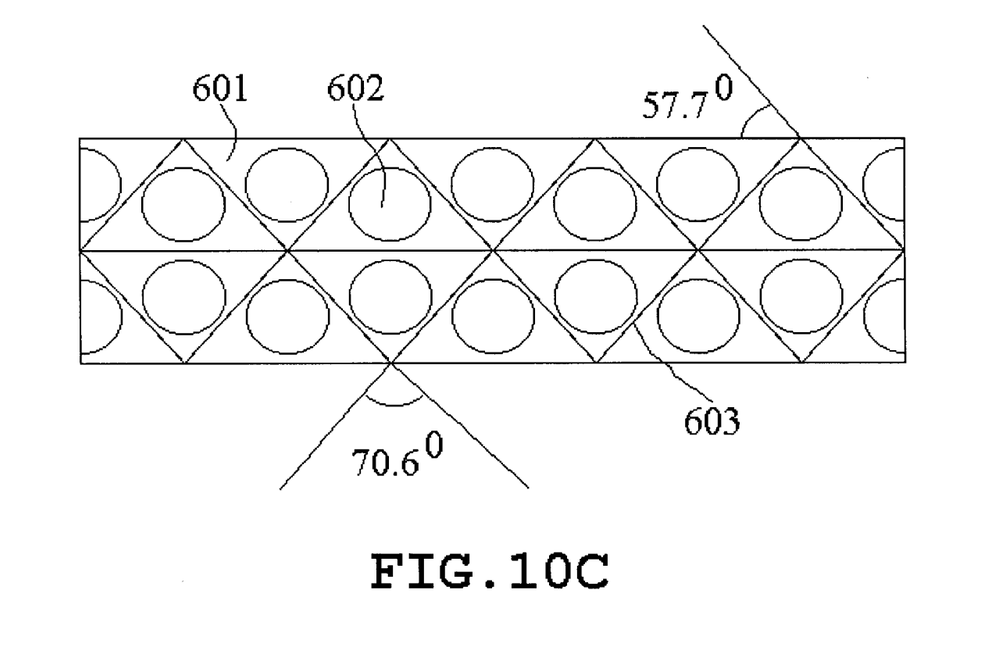

A plurality of microlenses 602 are formed on a glass plate 601, as shown in FIG. 10A and FIG. 10B. The microlenses are processed based on photoresist reflow process. A thick layer of photoresist on a glass plate 601 is patterned into small squares. The glass plate 601 is heated above the melting temperature of the photoresist, and surface tension pulls the volume of the photoresist square toward a spherical shape. The glass plate 601 is then cooled down to keep the spherical shape and form microlenses 602. It is noted that the microlenses are arranged so that after the glass plate is cut into small V-shape dies each microlens locates in the center region of a die. The glass plate 601 is cut by dicing saw. The cutting lines 603 are aligned to form 54.7° and 70.6° angles between each other, as shown in FIG. 10C.

Figure 11:
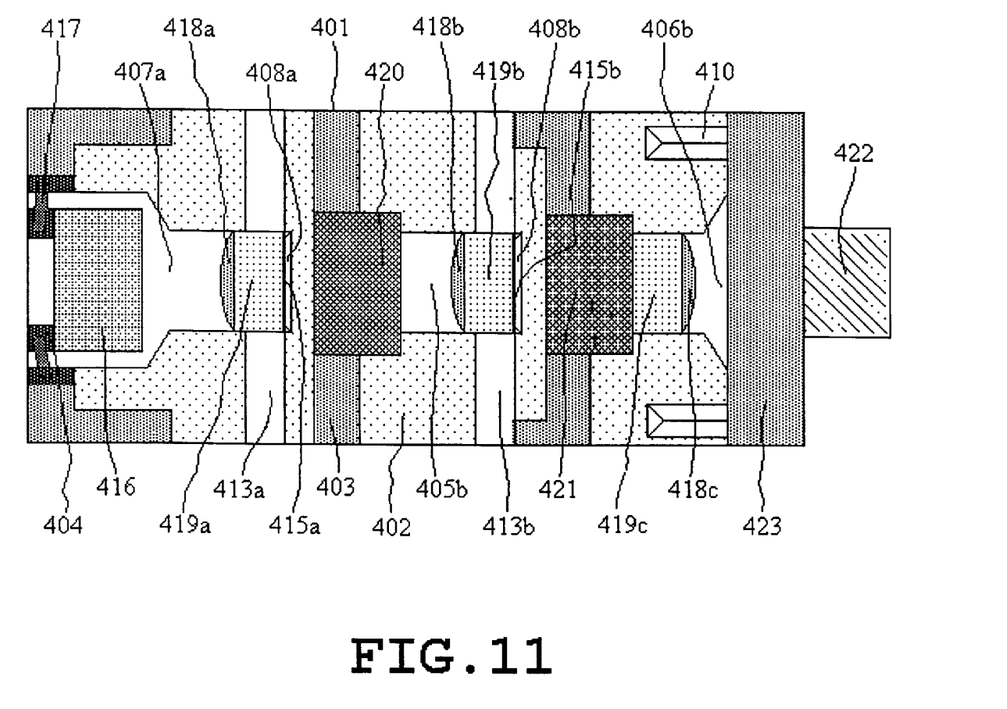
FIG. 11 illustrates the plan view of the wavelength division multiplexing transmitter and receiver module shown in FIG. 3.

A plan view of a packaged optoelectronic transmitter and receiver module is shown in FIG. 11. A micromachined silicon substrate 401 is used as a mounting platform. The platform 401 has a dielectric layer 402 formed on its surface and a metallization pattern 403 formed on the surface of the dielectric layer 402. The platform has three V-grooves 405*a*, 405*b*, and 405*c*, two trenches 413*a* and 413*b*, a multilayered filter, a multilayered half-mirror, two multilayered anti-reflectors 415*a* and 415*b* therein. The multilayered filter is attached on the surface of a slanted end side wall of the V-groove 405*c*. The multilayered half-mirror is attached on the surface of a slanted end side wall of the V-groove 405*b*. The trench 413*a* passes across the slanted end side wall 408*a* of the V-groove 405*a* and the trench 413*b* passes across the slanted end side wall 408*b* of the V-groove 405*b*. The anti-reflection layer 415*a* is attached on the vertical surface of the trench 413*a* which is formed by cutting the slanted end side wall 408*a* and the anti-reflection layer 415*b* is attached on the vertical surface of the trench 413*b* which is formed by cutting the slanted end side wall 408*b*. The microlens 418*a* mounted on the surface of the V-support 419*a* is placed and fixed in the V-groove 405*a* with the back side abutting against the anti-reflection layer 415*a*, the microlens 418*b* mounted on the surface of the V-support 419*b* is placed and fixed in the V-groove 405*b* with the back side abutting against the anti-reflection layer 415*b*, and the microlens 418*c* mounted on the V-support 419*c* is placed and fixed in the V-groove 405*c* with the back side facing the multilayered filter (not shown in FIG. 11). An optical fiber 422 is inserted in the V-groove 405*c* and a cover 423 is placed and fixed on the top of the optical fiber with its alignment ribs inserting alignment notches 410 so that the optical fiber 422 is aligned with the common longitudinal axis of the V-grooves 405*a*, 405*b*, and 405*c*. A sub-mounted laser diode 416 is placed and fixed in the V-groove 405*a* so that the emitting stripe is aligned with the core of the optical fiber 422. The fixation is realized by using an optical transparent adhesive. The laser diode 416 is electrically connected to the metallization 403 by bonding wire 417 to bonding pads 404. A photodetector 420 is mounted on the top of the multilayered half-mirror by aligning its bond pads to the solder bumps located at the two side edges of the V-groove 405*b*, then melting and fixing them. Another photodetector 421 is mounted on the top of the multilayered filter by aligning its bond pads to the solder bumps located at the two side edges of the V-groove 405*c*.

Modifications and variations of the wavelength division multiplexing transmitter and receiver module and method of fabrication thereof will be obvious to those skilled in the art from the foregoing detailed description of the present invention. Such modifications and variations are intended to come within the scope of the appended claims.

What is claimed is:

1. A wavelength division multiplexing transmitter and receiver module comprising:

a silicon substrate having two V-grooves disposed along a common longitudinal axis and extending across the substrate, of which the first one has a slanted end side wall at the central region of the substrate and an opposite notch at an edge of the substrate, and the second one has a vertical end side wall at the central region of the substrate and an opposite notch at another edge of the substrate;

a dielectric multilayered filter attached on the surface of said slanted end side wall;

a dielectric multilayered anti-reflecting layer attached on the surface of said vertical end side wall;

a first microlens attached on a side surface of a V-support and disposed in said first V-groove with its back side facing said filter;

a second microlens attached on a side surface of a V-support and disposed in said second V-groove with its back side abutting against said vertical side wall;

an optical fiber inserted in said first V-groove and having its proximal end facing said filter;

a transmitter mounted on a V-submount and disposed in said second V-groove with its light emitting stripe directing the front side of said second microlens; and a receiver mounted on the top of said first V-groove with its optical sensitive area facing said filter.

2. A wavelength division multiplexing transmitter and receiver module according to claim 1, wherein said substrate is a (410) oriented silicon wafer.

3. A wavelength division multiplexing transmitter and receiver module according to claim 1, wherein said substrate is a (100) oriented silicon wafer.

4. A wavelength division multiplexing transmitter and receiver module according to claim 1, wherein said V-supports for supporting said microlenses are made of glass.

5. A wavelength division multiplexing transmitter and receiver module according to claim 1, wherein said V-supports for supporting said microlenses are made of silicon.

6. A wavelength division multiplexing transmitter and receiver module according to claim 1, wherein said V-submount for supporting said transmitter is made of silicon.

7. A wavelength division multiplexing transmitter and receiver module comprising:

a silicon substrate at least having three V-grooves disposed along a common longitudinal axis and extending across the substrate, of which the first one disposes at a side region of the substrate, extends to an edge of the substrate, and has a slanted end side wall and an opposite notch, the second one disposes at the central region of the substrate and has a slanted end side wall parallel to the slanted end side wall of the first V-groove and an opposite vertical end side wall, and the third one disposes at another side region of the substrate, extends to another edge of the substrate, and has a vertical end side wall and an opposite notch;

a dielectric multilayered filter attached on the surface of said slanted end side wall of said first V-groove;

a dielectric multilayered half-mirror attached on the surface of said slanted end side wall of said second V-groove;

a dielectric multilayered anti-reflecting layer attached on the surface of each of said vertical end side walls;

a first microlens attached on a side surface of a V-support and disposed in said first V-groove with its back side facing said filter;

a second microlens attached on a side surface of a V-support and disposed in said second V-groove with its back side abutting against said vertical end side wall of said second V-groove;

a third microlens attached on a side surface of a V-support and disposed in said third V-groove with its back side abutting against said vertical end side wall of said third V-groove;

an optical fiber inserted in said first V-groove and having its proximal end facing said filter;

a transmitter mounted on a V-submount and disposed in said third V-groove with its light emitting stripe directing the front side of said third microlens;

a first receiver mounted on the top of said first V-groove with its optical sensitive area facing said filter; and a second receiver mounted on the top of said second V-groove with its optical sensitive area facing said half-mirror.

8. A wavelength division multiplexing transmitter and receiver module according to claim 7, wherein said substrate is a (410) oriented silicon wafer.

9. A wavelength division multiplexing transmitter and receiver module according to claim 7, wherein said substrate is a (100) oriented silicon wafer.

10. A wavelength division multiplexing transmitter and receiver module according to claim 7, wherein said V-supports for supporting said microlenses are made of glass.

11. A wavelength division multiplexing transmitter and receiver module according to claim 7, wherein said V-supports for supporting said microlenses are made of silicon.

12. A wavelength division multiplexing transmitter and receiver module according to claim 7, wherein said V-submount for supporting said transmitter is made of silicon.

13. A method for manufacturing a wavelength division multiplexing transmitter and receiver module comprising the steps of:

providing a silicon substrate;

forming three V-grooves: first V-groove, second V-groove and third V-groove in said silicon substrate so that they are disposed along a common longitudinal axis, extend across the substrate, and have the second one located at the center, the first one and the third one located at the two sides;

forming a dielectric multilayered filter on the surface of the slanted end side wall of said first V-groove;

forming a dielectric multilayered half-mirror on the surface of the slanted end side wall of said second V-groove which is parallel to said slanted end side wall of said first V-groove;

forming a first end vertical side wall by cutting the slanted end side wall of said second V-groove which is opposite to said half-mirror and a second vertical end side wall by cutting the slanted end side wall of said third V-groove which is parallel to said first vertical side wall;

forming a dielectric multilayered anti-reflecting layer on the surface of each of said vertical end side walls;

placing a first microlens attached on a side surface of a V-support into said first V-groove with its back side facing said filter;

placing a second microlens attached on a side surface of a V-support into said second V-grooves with its back side abutting said first vertical end side wall;

placing a third microlens attached on a side surface of a V-support into said third V-grooves with its back side abutting said second vertical end side wall;

inserting an optical fiber into said first V-groove with its proximal end facing the front side of said first microlens;

placing a transmitter mounted on a V-submount into said third V-groove with its light emitting stripe aligned with the core of said optical fiber;

placing a first photodetector onto the top of said filter so that a first light optical beam coming from said optical fiber is reflected by said filter and then projected on its optical sensitive area; and placing a second photodetector onto the top of said half-mirror so that a second light optical beam coming from said optical fiber is reflected by said half-mirror and then projected on its optical sensitive area.

14. A method for manufacturing a wavelength division multiplexing transmitter and receiver module to claim 13, wherein said silicon substrate is a (100) oriented silicon wafer.

15. A method for manufacturing a wavelength division multiplexing transmitter and receiver module to claim 13, wherein said silicon substrate is a (410) oriented silicon wafer.

16. A method for manufacturing a wavelength division multiplexing transmitter and receiver module to claim 13, wherein said vertical end side walls are formed by dicing saw cutting of corresponding slanted end side walls.

17. A method for manufacturing a wavelength division multiplexing transmitter and receiver module to claim 13, wherein said vertical end side walls are formed by laser ablation of corresponding slanted end side walls.

18. A method for manufacturing a wavelength division multiplexing transmitter and receiver module to claim 13, wherein said V-supports for supporting said microlenses are formed by dicing saw cutting of their glass substrate.

19. A method for manufacturing a wavelength division multiplexing transmitter and receiver module to claim 13, wherein said V-supports for supporting said microlenses are formed by dicing saw cutting of their silicon substrate.

20. A method for manufacturing a wavelength division multiplexing transmitter and receiver module to claim 13, wherein said V-supports for supporting said microlenses are formed by laser ablation of their glass substrate.

21. A method for manufacturing a wavelength division multiplexing transmitter and receiver module to claim 13, wherein said V-supports for supporting said microlenses are formed by laser ablation of their silicon substrate.

22. A method for manufacturing a wavelength division multiplexing transmitter and receiver module to claim 13, wherein said V-submounts for supporting said laser diodes are formed by etching of a silicon wafer in an anisotropic solution.

* * * * *